April 17, 1951   T. R. YOUNG   2,549,741
PIPE JOINT
Filed Feb. 16, 1948
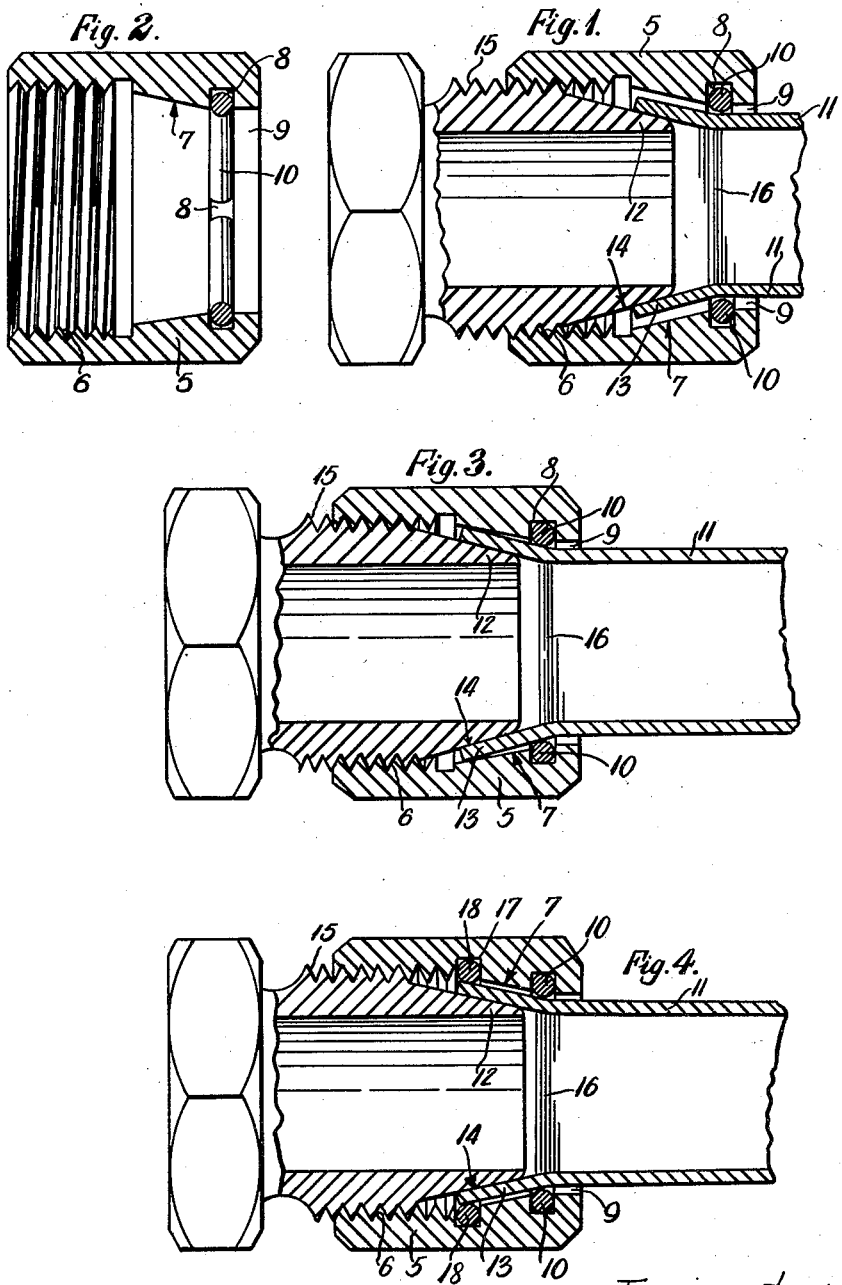
Inventor
Thomas R. Young
By Young, Emery & Thompson
Attys.

Patented Apr. 17, 1951

2,549,741

UNITED STATES PATENT OFFICE 2,549,741

PIPE JOINT

Thomas R. Young, Bonnyrigg, Scotland

Application February 16, 1948, Serial No. 8,562
In Great Britain November 28, 1946

Section 1, Public Law 690, August 8, 1946
Patent expires November 28, 1966

5 Claims. (Cl. 285—86)

This invention relates to pipe joints of the kind in which a conically flared end of a ductile metal pipe is clamped between a tubular conical spigot and an internal conically tapered portion of a coupling member or nut apertured to fit on the pipe and internally screw-threaded in front of the said tapered portion for engagement with an external screw-thread formed on a cooperating coupling element.

My invention is concerned with coupling devices for pipe joints of the kind above defined which comprise an internally screw-threaded coupling member or coupling nut having an aperture to fit over the pipe, a conically tapered portion between said aperture and the internal screw-thread, and a split ring housed within the coupling member or nut and forced thereby into contact with the pipe when the joint is made, and the characteristic feature of my invention is that the split ring is housed in an annular groove formed in the coupling member or nut between the conically tapered portion thereof and the aperture in the back of the coupling member or nut, the depth of the groove and the diameter or thickness of the split ring being such that the split ring at all times protrudes beyond the groove and is free to be expanded therein.

My invention also consists in a pipe joint as above defined wherein the conicity of the tapered portion of the coupling member or nut differs from the conicity of the flared pipe end, with the result that, in making the joint by screwing the coupling member or nut upon the cooperating coupling element, the extreme outer edge of the flared pipe end is engaged with the tapered portion of the coupling member or nut to press the flared pipe end upon the spigot when the coupling member or nut is screwed up, the said split ring being drawn along the parallel portion of the pipe by the coupling member or nut and permitting the latter to revolve on the split ring until it is drawn on to the curved portion of the pipe formed at the junction of the parallel portion with the conically flared end, whereupon the split ring contracts the curved junction of the pipe inwards to force the narrower end of the conically flared pipe end into fluid tight contact with the spigot and to cause the flared pipe end to conform to the taper of the spigot. Final tightening up of the coupling member or nut causes the split ring to bite into the pipe and to be expanded until the ring binds against the base of the groove and the coned portion of the nut grips the end of the pipe to the spigot, thus preventing further tightening of the coupling member or nut.

The invention may also include the provision of a secondary split ring housed in an annular groove formed in the wider end of the conically tapered portion of the coupling member or nut, this secondary split ring being adapted to engage the flared pipe end near its wider extremity.

The accompanying drawings illustrate examples of the manner of carrying out the invention, Fig. 1 being a sectional view of a pipe coupling with the coupling nut in position ready for binding the flared pipe to a spigot member. Fig. 2 is a sectional view of the coupling nut detached, and Fig. 3 is a sectional view of the pipe joint completed.

Fig. 4 illustrates a completed pipe joint employing a coupling nut modified by the provision of two split rings.

Referring firstly to Figs. 1 to 3, there is shown a coupling nut 5 having an internal screw-thread 6, an internal conically tapered surface 7 in rear of the thread 6, an annular groove 8 in rear of the tapered surface 7 and an aperture 9 in the back of the nut. A split ring 10 is housed in the groove 8, the normal internal diameter of the ring 10 being less than the diameter of the aperture 9, so that the ring 10 projects partly out of the groove 8. The ring 10 is adapted to grip the parallel portion of the pipe 11 which is to be joined to a spigot member 12, for which purpose the pipe 11 is flared at 13 to fit the conically tapered external surface 14 of the spigot member 12 which is provided with an external screw-thread 15 with which the thread 6 of the coupling nut can be engaged. In the example illustrated, the screw-thread 15 is formed on the spigot member 12, but the screw-thread 15 may be formed on a member into which the spigot member 12 is fitted.

When the coupling nut 5 is fitted upon the parallel portion of the pipe, the split ring 10 clings to the pipe so that the nut cannot slip on the pipe if the latter is in an upright position. After the coupling nut has been placed on the pipe, the flared pipe end 13 is fitted over the spigot member 12 and the coupling nut 5 is engaged with the screw-thread 15 as shown in Fig. 1 in which position the split ring 10 fits loosely in the groove 8 and allows the coupling nut 5 to be rotated without rotating the ring 10 or twisting the pipe 11. During the screwing up of the nut 5, the ring 10 is displaced along the pipe and along the curved portion 16 where the flared pipe end 13 joins the straight portion of the pipe. In the final binding of the joint, the ring 10 compresses the curved portion 16 until the flared pipe end 13 closely fits the external surface 14 of the spigot member 12.

It is preferred that the taper of the conical surface 7 of the nut 5 should slightly differ from the taper of the conical surface 14 of the spigot member 12 so that, when the coupling nut 5 is screwed upon the thread 15, the wider end only of the conical surface 7 will engage the flared pipe end 13, as shown to a somewhat exaggerated extent in Fig. 3, in which case the final tightening up of the nut will cause the ring 10 to compress the curved portion 16 of the pipe inwards until the flared pipe end 13 closely fits the conical surface 14 of the spigot member 12.

For larger sizes of pipes, the coupling nut 5, as shown in Fig. 4, may have an annular groove 17 in the wider end of the tapered surface 7 to receive a secondary split ring 18 which normally projects partially out of the groove 17 and engages the flared pipe end 13 when the joint is being made. During final tightening up of the nut 5, the ring 18 binds on and is expanded by the flared pipe end until the ring 18 binds in the groove 17, and the ring 10 binds on the curved portion 16 of the pipe, in which position the rings 10 and 18 conjointly with the grip of the tapered surface 7 of the nut 5 on the flared pipe end 13 act to restrain withdrawal of the pipe end from the joint under any contraction of the pipe 11.

I claim:

1. A coupling device for a ductile metal pipe joint comprising a hollow coupling member having an internal screw thread formed in one end, a gradually diminishing coniform portion extending inwardly from the innermost end of said screw thread, an annular groove formed immediately adjacent the diminished end of said coniform portion, an expansible split ring received in said groove and retained therein against axial movement relatively to said member, the depth of said groove being such as to permit expansion of said split ring therein and protuberance of said split ring therefrom when said split ring is expanded into contact with the base of said groove, and an externally screw-threaded tubular spigot having a conical end adapted to be received in the screw-threaded end of said member, so that, when said member and spigot are assembled together with the flared portion of a pipe interposed therebetween, the outer end of the flared portion of the pipe will be wedged between and in direct contact with the coniform portion of said member and the conical end of said spigot, and the inner end of the flared portion of the pipe will be spaced away from said member by said split ring and forced into intimate contact with the conical end of said spigot.

2. A pipe joint for a ductile metal pipe having a straight portion and a conically flared end comprising a tubular spigot having a conical end, an externally screw-threaded coupling element to which said spigot is fitted, a hollow coupling member having an internal screw-threaded region for receiving said screw-threaded coupling element, a conically tapered surface in said member extending inwardly from said internal screw-threaded region, an annular groove formed in said member immediately adjacent the end of said tapered surface remote from said region, and an expansible split-ring received in said groove and retained thereby against axial movement relative to said member, said split-ring directly and frictionally engaging the straight portion of said pipe and spacing the pipe from said member before the joint is made, and expanding in said groove when forced upon the flared pipe end by the cooperation of said member with said element during the making of the joint so that, when the joint is made, the outer end of said flared pipe end is wedged between said spigot and said member and the inner end of said flared pipe end is spaced away from said member by said split ring and forced into intimate contact with said spigot.

3. A coupling device as claimed in claim 1 including an annular groove in said member between said coniform portion and said internal screw thread and a secondary expansible split ring freely housed in and protruding from said last-mentioned groove and prevented from axial movement therein relatively to said member.

4. A pipe joint as claimed in claim 2 including a secondary annular groove in said member between said tapered surface and said internal screw-threaded region, and a secondary split ring housed in and protruding from said secondary groove and expansible therein, said secondary groove preventing axial movement of said secondary split ring relatively to said member.

5. A coupling device for a ductile metal pipe joint comprising a hollow coupling member having an aperture at one end to fit over the pipe, an internal screw thread in its other end portion, a conically tapered portion between said aperture and screw thread, an annular groove in said member adjacent said aperture, an expansible split ring received in said groove and retained therein against axial movement relatively to said member, the depth of said groove being such that said split ring will protrude from said member when expanded into contact with the base of said groove, an externally screw-threaded tubular spigot having a conical end adapted to be received in the screw-threaded end of said member, the conicity of the conical end of said spigot differing from the conicity of the conically tapered portion in said member so that, when said member and spigot are assembled together with a flared portion of the pipe interposed therebetween, the outer end of the flared portion of the pipe will be wedged between and in direct contact with the conically tapered portion of said member and the conical end of the said spigot, and the inner end of the flared portion of the pipe will be spaced away from said member by said split ring and forced into intimate contact with the conical end of said spigot.

THOMAS R. YOUNG.

REFERENCES CITED

The following references are of record in the file of this patent:

UNITED STATES PATENTS

| Number | Name | Date |
|---|---|---|
| 487,829 | England | Dec. 13, 1892 |
| 2,251,715 | Parker | Aug. 5, 1941 |
| 2,389,233 | Cowles | Nov. 20, 1945 |

FOREIGN PATENTS

| Number | Country | Date |
|---|---|---|
| 646,512 | France | Nov. 13, 1928 |
| 59,687 | Denmark | Apr. 7, 1942 |